United States Patent
Duvinage et al.

(10) Patent No.: US 6,892,529 B2
(45) Date of Patent: May 17, 2005

(54) EXHAUST-GAS PURIFICATION SYSTEM FOR AN INTERNAL COMBUSTION ENGINE

(75) Inventors: Frank Duvinage, Kirchheim (DE); Christian Goerigk, Leutenbach (DE); Thomas Liebscher, Fellbach (DE); Dieter Mainka, LE.-Echterdingen (DE); Siegfried Mueller-Lunz, Schorndorf (DE); Arno Nolte, Stuttgart (DE); Markus Paule, Korb (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/372,660

(22) Filed: Feb. 25, 2003

(65) Prior Publication Data

US 2003/0209011 A1 Nov. 13, 2003

(30) Foreign Application Priority Data

Feb. 25, 2002 (DE) .......................... 102 07 986

(51) Int. Cl.⁷ ................................ F01N 3/00
(52) U.S. Cl. ............... 60/286; 60/295; 60/297; 60/301; 60/303
(58) Field of Search ............ 60/286, 295, 297, 60/301, 303, 311

(56) References Cited

U.S. PATENT DOCUMENTS

| | | | | |
|---|---|---|---|---|
| 5,412,946 A | * | 5/1995 | Oshima et al. | 60/286 |
| 5,746,989 A | * | 5/1998 | Murachi et al. | 423/213.7 |
| 6,235,254 B1 | * | 5/2001 | Murphy et al. | 423/212 |
| 6,314,722 B1 | * | 11/2001 | Matros et al. | 60/274 |
| 6,718,757 B2 | * | 4/2004 | Khair et al. | 60/286 |

FOREIGN PATENT DOCUMENTS

| | | | | |
|---|---|---|---|---|
| DE | 4032085 | | 4/1992 | |
| DE | 10242303 A1 | * | 12/2002 | 60/286 |
| EP | 0806553 | | 11/1997 | |
| EP | 0896831 | | 2/1999 | |
| JP | 2003314257 A | * | 11/2003 | 60/286 |

* cited by examiner

Primary Examiner—Binh Q. Tran
(74) Attorney, Agent, or Firm—Crowell & Moring LLP

(57) ABSTRACT

An Exhaust-gas purification system for an internal combustion engine, which, as seen in the direction of flow of the exhaust gas, has a particle filter, apparatus for providing a reducing agent in the exhaust-gas flow, a catalytic converter for reducing nitrogen oxide which is present in the exhaust gas, and a downstream oxidation catalytic converter. An upstream oxidation catalytic converter is arranged upstream of the particle filter.

8 Claims, 2 Drawing Sheets

EXHAUST-GAS PURIFICATION SYSTEM FOR AN INTERNAL COMBUSTION ENGINE

BACKGROUND OF THE INVENTION

This application claims the priority of German Application 102 07 986.2 filed Feb. 25, 2002, the disclosure of which is expressly incorporated by reference herein.

The present invention relates to an exhaust-gas purification system for an internal combustion engine, which, as seen in the direction of flow of the exhaust gas, has a particle filter, provision for a reducing agent in the exhaust-gas flow, a catalytic converter for reducing nitrogen oxide which is present in the exhaust gas, and a downstream oxidation catalytic converter.

DE 40 32 085 A1 has disclosed a catalytic converter arrangement for the reduction of nitrogen oxides. In that known catalytic converter arrangement, a soot particle filter, a temperature peak buffer, an injection device for ammonia, a flow mixer, a first denox catalyst bed, a second denox catalyst bed and an oxidation catalyst bed are arranged in a common housing, one behind the other as seen in the direction of flow. The first denox catalyst bed has its optimum efficiency at higher temperatures than the second denox catalyst bed.

EP 0 806 553 A2 has disclosed a method for exhaust-gas purification in diesel engines, in which fuel is added to the exhaust-gas passage in order to wet soot in a soot filter and to enrich the levels of HC. An oxidation catalytic converter may be provided upstream of the soot filter, and an oxidation catalytic converter or an SCR (Selective Catalytic Reduction) catalytic converter with integrated oxidation catalytic converter may be provided downstream of the soot filter. To enrich the levels of HC in the soot in the soot filter, a liquid fuel is added to the exhaust-gas passage.

EP 0 896 831 A1 has disclosed an exhaust-gas purification system for catalytic reduction of nitrogen oxides in which urea is introduced into the exhaust-gas path as a reducing agent. The urea is introduced upstream of a combination component comprising evaporator, gas mixer and hydrolysis catalytic converter. An oxidation catalytic converter may be provided upstream of the combination component and the injection device. A reduction catalytic converter may be provided downstream of the combination component and may be followed, as seen in the direction of flow, by an ammonia ($NH_3$) barrier catalytic converter.

SUMMARY OF THE INVENTION

An object of the present invention is to provide an exhaust-gas purification system having an arrangement of components which allows a high operating reliability to be achieved even over prolonged operating periods combined, at the same time, with a significant reduction in the levels of emissions and a low additional fuel consumption.

For this purpose, the present invention provides an exhaust-gas purification system for an internal combustion engine, which, as seen in the direction of flow of the exhaust gas, has a particle filter, apparatus for providing a reducing agent in the exhaust-gas flow, a catalytic converter for reducing nitrogen oxide which is present in the exhaust gas, and a downstream oxidation catalytic converter, in which system, as seen in the direction of flow of the exhaust gas, an upstream oxidation catalytic converter is arranged upstream of the particle filter.

One of the problems which the invention solves is adhered by an exhaust-gas purification system in which the particle filter is provided with an oxidation catalyst coating.

With the upstream oxidation catalytic converter arranged upstream of the particle filter or with the particle filter with oxidation catalyst coating, it is now possible to achieve oxidation of hydrocarbons and carbon monoxide. Furthermore, the upstream oxidation catalytic converter, if appropriate in combination with an after injection of fuel in the combustion chamber, can be used to increase the exhaust-gas temperature, in order to regenerate the particle filter, to increase the temperature of the catalytic converter for reducing nitrogen oxide into the catalytically active range and to avoid or reduce the extent of sooting effects which correspond to the catalytic converter surface being occupied by low-volatility hydrocarbons and soot. In this way, it is possible to reduce the emissions, to keep the exhaust-gas temperature within a range in which the catalytic converter for the reduction of nitrogen oxide operates and to maintain the ability to function and operational reliability of the system over a prolonged operating period.

The selected combination and arrangement of the components results in an exhaust-gas purification system which represents an effective overall system whose components are matched to one another. For example, the level of particle emissions is reduced by the particle filter. The apparatus for producing a reducing agent in the exhaust-gas flow, for example an injection device for ammonia, and the catalytic converter for reduction of nitrogen oxide which is present in the exhaust gas, this catalytic converter following the apparatus for providing a reducing agent, as seen in the direction of flow, and advantageously being designed as what is known as an SCR (Selective Catalytic Reduction) catalytic converter, can firstly reduce nitrogen oxides to form nitrogen and secondly oxidize hydrocarbons and carbon monoxide.

Furthermore, by-products which are formed during the particle filter regeneration can be oxidized as can residual hydrocarbons and carbon monoxide which may form as a result of any heating measures at the upstream oxidation catalytic converter. Excess reducing agent, for example ammonia, which is liberated when the apparatus for providing the reducing agent or the SCR catalytic converter is not operating optimally and is present in the exhaust-gas flow, can be oxidized in the downstream oxidation catalytic converter, so that it is not emitted to the environment.

The apparatus for providing a reducing agent in the exhaust-gas flow are responsible for controlled provision of the required reducing agent as a function of the operating characteristics of the internal combustion engine. Reducing agents used may, for example, be ammonia ($NH_3$), urea in solid form or in aqueous solution, ammonium carbamate and other substances which allow ammonia to be released.

In a further embodiment of the invention, hydrogen or fuel can be introduced into the exhaust-gas flow upstream of the particle filter and/or upstream of the upstream oxidation catalytic converter and/or of the catalytic converter for reducing nitrogen which is present in the exhaust gas.

The light-off temperature of the HC and CO oxidation at the upstream or downstream oxidation catalytic converter can be lowered by hydrogen or fuel being metered into the exhaust-gas flow. In this situation, it has been found advantageous for this metering to take place upstream of the respective oxidation catalytic converter. Furthermore, metering hydrogen or fuel into the exhaust-gas flow makes it possible to lower the light-off temperature of the $NO_x$ reduction in the SCR catalytic converter. Here, it is advantageous for metering to take place upstream of the SCR catalytic converter. It is also possible to assist the regeneration of the particle filter by hydrogen or fuel being metered in upstream of the particle filter.

In a yet further embodiment of the invention, the apparatus for providing a reducing agent in the exhaust-gas flow include a device for introducing urea into the exhaust-gas flow and a hydrolysis catalytic converter arranged in the exhaust-gas flow. The hydrolysis of urea can be assisted by a hydrolysis catalytic converter.

In a still additional embodiment of the invention, a gas-mixing device is provided in the exhaust-gas flow upstream of the catalytic converter for reducing nitrogen which is present in the exhaust gas.

A homogeneous distribution of the reducing agent in the exhaust gas can be achieved by a gas mixer. In one embodiment, the gas-mixing device is at least partly coated with a material which acts as a hydrolysis catalyst. In this manner, it is possible to dispense with the need for an additional hydrolysis catalytic converter without having to do without its function of assisting the hydrolysis of urea.

In another embodiment, the gas-mixing device is at least partly coated with a material which acts as a catalyst for reducing nitrogen oxide present in the exhaust gas. These measures make it possible to assist with the reduction of nitrogen oxide to form nitrogen. By way of example, the gas-mixing device may be coated with an SCR catalyst.

In a still further embodiment, there are at least one temperature sensor, at least one pressure sensor in the region of the particle filter, at least one nitrogen oxide sensor and at least one ammonia sensor in the exhaust-gas flow. A central control unit is provided to control the apparatus for producing a reducing agent and for introducing hydrogen or fuel as a function of signals from the sensors.

The provision of sensors and of a central control unit which processes the sensor signals makes it possible to ensure intelligent operation of the exhaust-gas cleaning system which is regulated as a function of the sensor signals. As a result, HC, CO, $NO_x$, and particle emissions can be effectively lowered even at low exhaust-gas temperatures. By way of example, the addition of hydrogen or fuel into the exhaust-gas flow effected by the central control unit makes it possible to increase the catalytic converter temperature to such an extent that high $NO_x$ conversion rates and reliable operation of the particle filter can be achieved.

Furthermore, it is also possible for an injection system of the internal combustion engine to be controlled by the central control unit, so that, by way of example, an exhaust-gas temperature can be increased by an after injection of fuel.

Other objects, advantages and novel features of the present invention will become apparent from the following detailed description of the invention when considered in conjunction with the accompanying drawings.

DETAILED DESCRIPTION OF THE DRAWINGS

Figure 1:
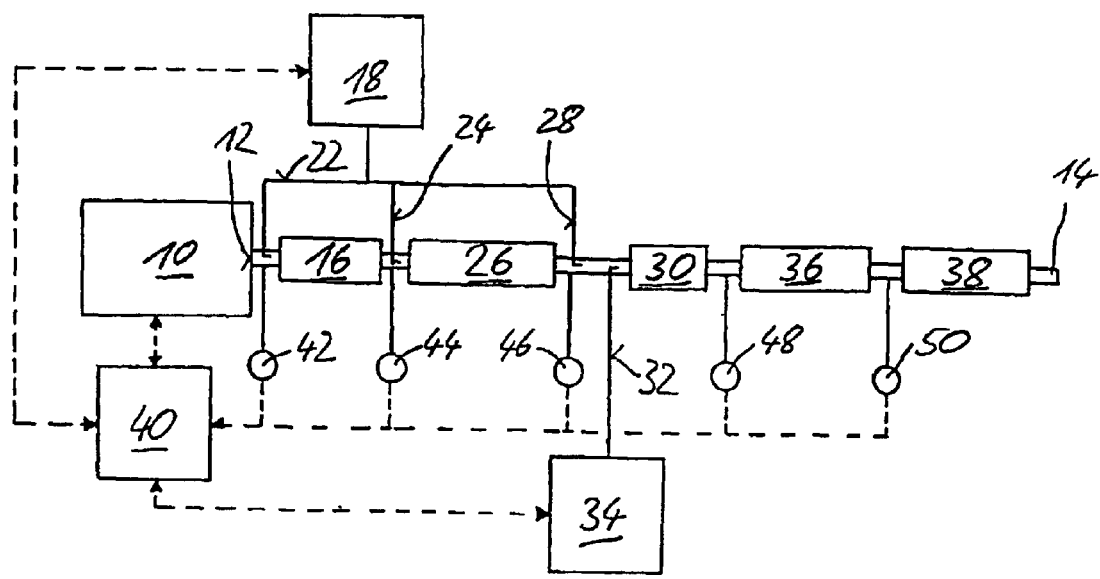
FIG. 1 is a schematic diagram showing a first embodiment of the present invention.

FIG. 1 shows a diesel engine 10 which is connected to an exhaust-gas purification system. The exhaust gases enter the exhaust-gas purification system via an exhaust 12 and leave this system to pass into the environment at an exhaust denoted by numeral 14. In this first embodiment of the invention, the exhaust gas from the diesel engine 10 passes firstly to an oxidation catalytic converter 16. In this upstream oxidation catalytic converter, hydrocarbons HC and carbon monoxide CO are oxidized. The exhaust-gas temperature can be increased by the oxidation catalytic converter 16 in conjunction with an afterinjection of fuel via the injection system of the diesel engine 10.

The exhaust-gas temperature can also be increased by separate metering of hydrogen into the exhaust-gas flow. To meter hydrogen into the exhaust-gas flow, there is a metering device 18 for hydrogen, which device is connected to a line 22 opening out into the exhaust section upstream of the upstream oxidation catalytic converter 16. A further line 24, which likewise leads from the metering device 18 for hydrogen, opens out into the exhaust section downstream of the upstream oxidation catalytic converter 16.

The oxidation catalytic converter 16 is followed by a particle filter 26 which reduces the level of particle emissions. Downstream of the particle filter 26, a further line 28, which is likewise connected to the metering device 18 for hydrogen, opens out into the exhaust section.

Downstream of the particle filter 26, the exhaust gas passes into a hydrolysis catalytic converter 30, a line 32, which leads from a metering device for reducing agent 34, opening into the exhaust section downstream of the hydrolysis catalytic converter 30. In the illustrated embodiment, urea is introduced into the exhaust-gas stream by the metering device 34 and the line 32. The hydrolysis of urea is assisted by the hydrolysis catalytic converter. Furthermore, the hydrolysis catalytic converter 30 is also responsible for a gas-mixing function, in order to achieve homogeneous distribution of the reducing agent in the exhaust gas.

Downstream of the hydrolysis catalytic converter 30, an SCR (Selective Catalytic Reduction) catalytic converter is connected into the exhaust section. Reduction of nitrogen oxides $NO_x$, to form nitrogen $N_2$ can be effected by the SCR catalytic converter. This is carried out using the reducing agent from the metering device 34. Furthermore hydrocarbons HC and carbon monoxide CO can be oxidized in the SCR catalytic converter 36. It is also possible to oxidize by-products which are formed during regeneration of the particle filter 26. Furthermore, it is possible to oxidize hydrocarbons HC and carbon monoxide CO which may form as a result of any heating operations at the oxidation catalytic converter 16.

A downstream oxidation catalytic converter 38 is arranged downstream of the SCR catalytic converter 36. This downstream oxidation catalytic converter 38 is used as a barrier catalytic converter for ammonia $NH_3$. Therefore, the downstream oxidation catalytic converter 38 prevents ammonia from passing into the environment in the event of operation of the metering device 34, when the hydrolysis catalytic converter 30 or the SCR catalytic converter 36 is not being in an optimum mode.

The injection system of the diesel engine 10, the metering device 18 for hydrogen and the metering device 34 for urea can be controlled by a central control unit 40. Exchange of data between the diesel engine 10, the metering device 18 and the metering device 34 is in each case indicated by a dashed double arrow running between these components. The measured values from the exhaust section which are required in order to control the injection system of the diesel engine 10, the metering device 18 and the metering device 34 are fed to the central control unit 40 from sensors 42, 44, 46, 48 and 50, which are only diagrammatically indicated. The transfer of measured values from the sensors 42, 44, 46, 48 and 50 to the central control unit 40 is indicated by dashed arrows.

Specifically, the sensor 42 records a first temperature of the exhaust gas upstream of the upstream oxidation catalytic converter 16. The sensor 44 indicates that a second temperature of the exhaust gas and an exhaust-gas pressure upstream of the particle filter 26 are recorded between the upstream oxidation catalytic converter 16 and the particle filter 26. A third temperature value for the exhaust gas, a second pressure of the exhaust-gas flow and a first nitrogen oxide value are recorded at the measurement point 46, which is arranged between the particle filter 26 and the hydrolysis catalytic converter 30.

A fourth temperature in the exhaust-gas flow is recorded downstream of the hydrolysis catalytic converter 30 and upstream of the SCR catalytic converter 36.

Finally, a fifth temperature value for the exhaust gas, a second nitrogen oxide value and a value which gives information about the residual ammonia content are recorded via a measurement point 50 upstream of the SCR catalytic converter 36 and upstream of the downstream oxidation catalytic converter 38.

On the basis of the values which have been recorded via the measurement points 42, 44, 46, 48 and 50 and made available to the central control unit 40, the latter is able to check the ability of the exhaust-gas purification system according to the invention to function and to control this system.

For example, the $NO_x$ sensors at the measurement points 46, 50 are provided in order to supply input values for monitoring the operation of the SCR catalytic converter 36, for controlling the metering of urea via the metering device 34 and to trigger or control regeneration of the particle filter 26.

The temperature sensors at the measurement points 42, 44, 46, 48 and 50 are used to allow the function of the upstream oxidation catalytic converter 16 and of the particle filter 26 to be monitored. Furthermore, these temperature sensors are used to control heating measures for regeneration of the particle filter 26 if the exhaust gas flowing through the particle filter 26 must be at a high temperature in order to effect regeneration thereof. Furthermore, the temperature sensors are used to control measures for increasing the exhaust-gas temperature which are intended to improve the nitrogen oxide conversion or to avoid sooting effects.

The $NH_3$ sensor at the measurement point 50 is provided in order to allow the metering of urea via the metering device 34 and the line 32 to be monitored and controlled. Furthermore, the $NH_3$ sensor at the measurement point 50 is used to monitor the function of the SCR catalytic converter 36.

The pressure sensors at the measurement points 44 and 46 are arranged upstream and downstream, respectively, of the particle filter 26 and are used to record the pressure drop across the particle filter 26. The input signals from these pressure sensors are used by the central control unit 40 to monitor the function of the particle filter and to control the regeneration of the particle filter 26.

The metering of hydrogen via the metering device 18 and the line 22, which opens out into the exhaust section directly upstream of the upstream oxidation catalytic converter 16, is provided in order to lower the light-off temperature of the HC and CO oxidation at the upstream oxidation catalytic converter.

Metering of hydrogen via the line 24, which opens out into the exhaust section between the upstream oxidation catalytic converter 16 and the particle filter 26, is provided in order to assist with regeneration of the particle filter 26. Metering of hydrogen via the line 28, which opens into the exhaust section between the particle filter 26 and the hydrolysis catalytic converter 30 and therefore upstream of the SCR catalytic converter 36, is provided in order to lower the light-off temperature of the reduction of the levels of $NO_x$ by way of the SCR catalytic converter 36.

Overall, the invention combines individual exhaust-gas aftertreatment techniques which, perse, operate independently for the reduction of hydrocarbons HC, carbon monoxide CO, nitrogen oxides $NO_x$ and particles. The invention appropriately matches all of the individual exhaust-gas aftertreatment techniques to one another.

Figure 2:
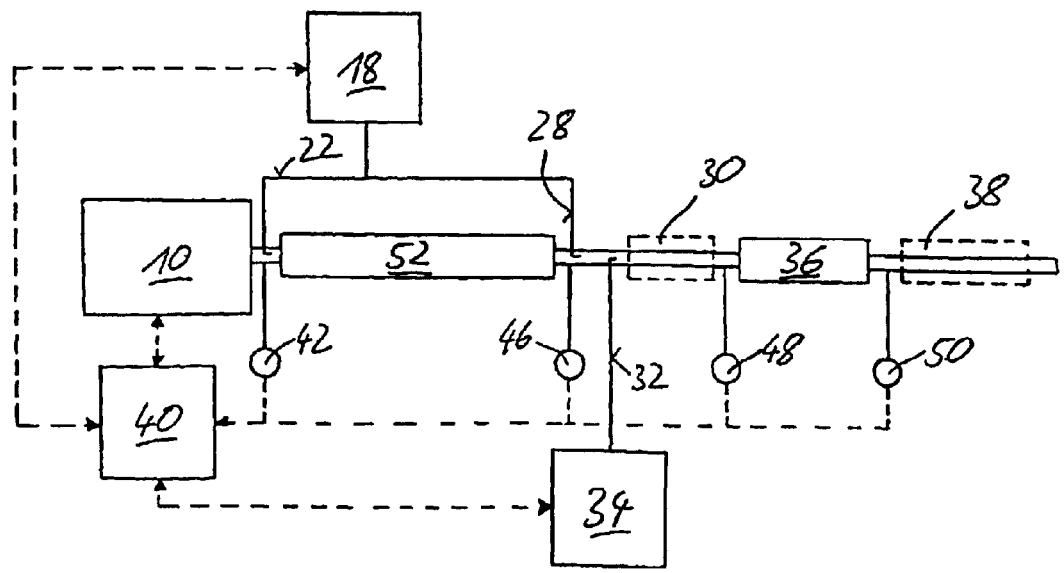
FIG. 2 is a schematic diagram showing a second embodiment of the present invention.

FIG. 2 shows a second currently preferred embodiment of the invention, in connection with which only the differences from the embodiment shown in FIG. 1 will be indicated. Close to the diesel engine 10 and immediately after it in the exhaust section there is a particle filter 52 having an oxidation catalyst coating. This particle filter 52 therefore takes over the function of the upstream oxidation catalytic converter 16 and of the particle filter 26 of the embodiment shown in FIG. 1.

The particle filter 52 is followed in the exhaust section by the SCR catalytic converter 36. The hydrolysis catalytic converter 30 may optionally be arranged between the particle filter 52 and the SCR catalytic converter 36. It will be understood that if the hydrolysis catalytic converter 30 is not arranged upstream of the SCR catalytic converter 36, ammonia is expediently introduced into the exhaust-gas flow via the metering device 34, as reducing agent. The downstream oxidation catalytic converter 38 may optionally follow downstream of the SCR catalytic converter 36.

Due to the combination of the upstream oxidation catalytic converter 16 and the particle filter 26 to form the particle filter 52 with an oxidizing coating, the line 24 from the metering device 18 for hydrogen to the exhaust section is also dispensed with compared to the embodiment shown in FIG. 1. In addition to the line 24, the measurement point 44 is also absent compared to FIG. 1. Otherwise, components which are identical to the embodiment shown in FIG. 1 are denoted by the same reference numerals as in FIG. 2.

Figure 3:
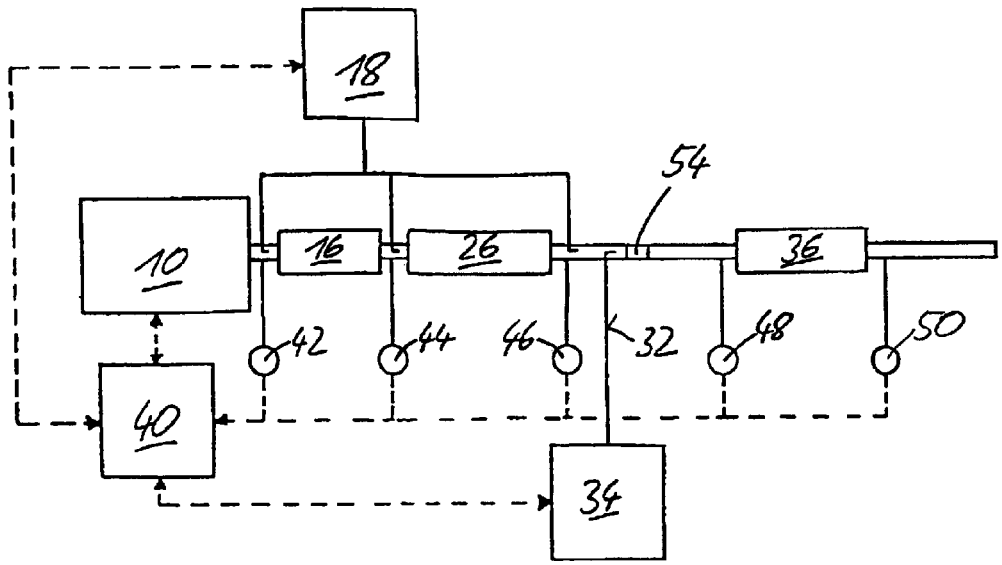
FIG. 3 is a schematic diagram showing a third embodiment of the present invention.

In the third embodiment of the invention shown in FIG. 3, compared to the embodiment shown in FIG. 1, the hydrolysis catalytic converter 30 and the downstream oxidation catalytic converter 38 have been eliminated. A gas-mixing device 54 is arranged downstream of the point where the line 32 opens out into the exhaust section (this line 32 leads from the metering device 34 for reducing agent). A homogeneous distribution of the reducing agent which has been introduced via the line 32 in the exhaust gas is achieved by the gas-mixing device 54. It is optionally also contemplated for the gas-mixing device 34 to be coated with a hydrolysis catalytic converter, in order in this way to assist with the hydrolysis of urea when the latter is used as reducing agent. Furthermore, the gas-mixing device 54 may be coated with an SCR catalyst, in order to assist an SCR reaction.

Otherwise, the components in the embodiment shown in FIG. 3 correspond to the components of the embodiment shown in FIG. 1 and are denoted by the same reference numerals.

Figure 4:
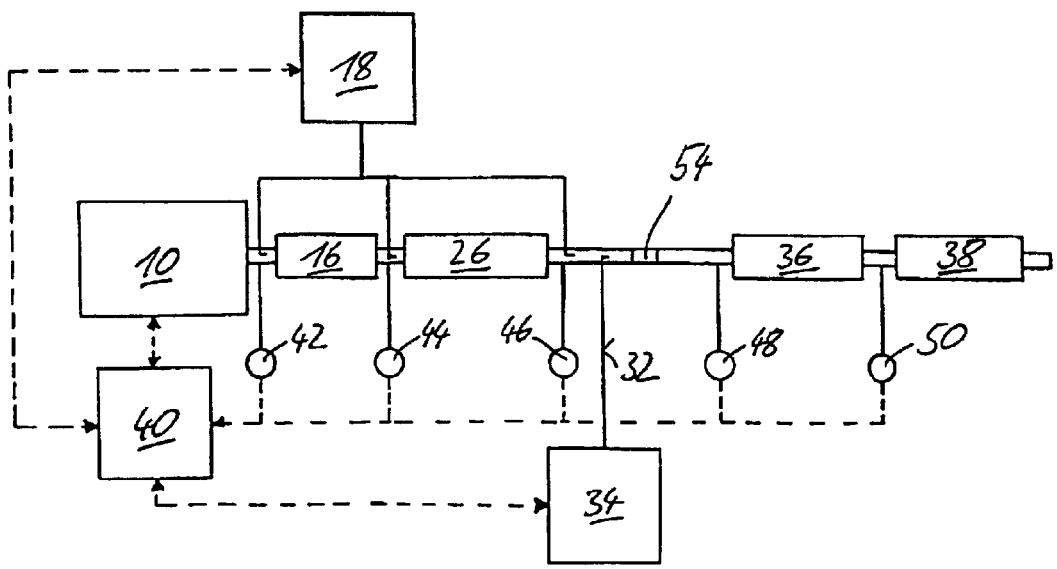
FIG. 4 is a schematic diagram showing a fourth embodiment of the present invention.

In the fourth preferred embodiment of the invention shown in FIG. 4, the only change from the, embodiment shown in FIG. 3 is that the downstream oxidation catalytic converter 38 has been added. As has been explained in connection with FIG. 1, the downstream oxidation catalytic converter 38 is used to oxidize ammonia in the exhaust-gas flow, so that this ammonia does not pass into the environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Exhaust-gas purification system for an internal combustion engine, comprising, as viewed in the direction of exhaust-gas flow, an upstream oxidation catalytic converter, a particle filter, an apparatus configured to provide urea in the exhaust gas flow, a catalytic converter for reducing exhaust gas nitrogen oxide and an apparatus configured to introduce hydrogen or fuel into the exhaust-gas flow at least one of upstream of the upstream oxidation catalytic converter, upstream of the particle filter and downstream of the upstream oxidation catalytic converter, and upstream of the catalytic converter for reducing exhaust gas nitrogen oxide and downstream of the particle filter.

2. Exhaust-gas purification system according to claim 1, further comprising a downstream oxidation catalytic converter arranged downstream of the catalytic converter for reducing exhaust gas nitrogen oxide.

3. Exhaust-gas purification system according to claim 1, wherein the particle filter has an oxidation catalyst coating.

4. Exhaust-gas purification system according to claim 2, wherein the particle filter has an oxidation catalyst coating.

5. Exhaust-gas purification system according to claim 1, further comprising a hydrolysis catalytic converter arranged upstream of the catalytic converter for reducing exhaust gas nitrogen oxide.

6. Exhaust-gas purification system according to claim 2, further comprising a hydrolysis catalytic converter arranged upstream of the catalytic converter for reducing exhaust gas nitrogen oxide.

7. Exhaust-gas purification system according to claim 3, further comprising a hydrolysis catalytic converter arranged upstream of the catalytic converter for reducing exhaust gas nitrogen oxide.

8. Exhaust-gas purification system according to claim 4, further comprising a hydrolysis catalytic converter arranged upstream of the catalytic converter for reducing exhaust gas nitrogen oxide.

* * * * *